(12) United States Patent
Lewis

(10) Patent No.: US 8,528,083 B2
(45) Date of Patent: Sep. 3, 2013

(54) USING A CALL GATE TO PREVENT SECURE SANDBOX LEAKAGE

(75) Inventor: Paton Lewis, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 152 days.

(21) Appl. No.: 13/045,339

(22) Filed: Mar. 10, 2011

(65) Prior Publication Data

US 2013/0167222 A1    Jun. 27, 2013

(51) Int. Cl.
 *G06F 21/22* (2006.01)
 *G06F 17/00* (2006.01)
 *G06F 9/445* (2006.01)

(52) U.S. Cl.
 USPC ............ 726/22; 726/1; 726/2; 719/328

(58) Field of Classification Search
 None
 See application file for complete search history.

(56) References Cited

U.S. PATENT DOCUMENTS

| | | | | |
|---|---|---|---|---|
| 5,974,549 A * | 10/1999 | Golan | ............... | 726/23 |
| 6,560,694 B1 * | 5/2003 | McGrath et al. | ............ | 712/210 |
| 6,571,330 B1 * | 5/2003 | McGrath et al. | ............ | 712/210 |
| 6,715,063 B1 * | 3/2004 | McGrath | ............... | 712/233 |
| 6,807,617 B2 * | 10/2004 | McGrath | ............... | 711/208 |
| 6,898,697 B1 * | 5/2005 | Gao et al. | ............... | 712/229 |
| 6,973,562 B1 * | 12/2005 | McGrath et al. | ............ | 712/229 |
| 7,073,173 B1 * | 7/2006 | Willman | ............... | 718/1 |
| 7,124,286 B2 * | 10/2006 | McGrath et al. | ............ | 712/229 |
| 7,260,717 B2 * | 8/2007 | Liu | ............... | 713/166 |
| 7,475,431 B2 * | 1/2009 | Chao | ............... | 726/30 |
| 7,543,293 B2 * | 6/2009 | Willman | ............... | 718/100 |
| 7,565,549 B2 * | 7/2009 | Satterlee et al. | ............ | 713/187 |
| 7,673,137 B2 * | 3/2010 | Satterlee et al. | ............ | 713/164 |
| 7,698,744 B2 * | 4/2010 | Fanton et al. | ............... | 726/27 |
| 2002/0188713 A1 * | 12/2002 | Bloch et al. | ............... | 709/223 |
| 2008/0016339 A1 * | 1/2008 | Shukla | ............... | 713/164 |
| 2008/0127292 A1 * | 5/2008 | Cooper et al. | ............... | 726/1 |
| 2009/0187697 A1 * | 7/2009 | Serebrin | ............... | 711/6 |
| 2009/0204964 A1 * | 8/2009 | Foley et al. | ............... | 718/1 |
| 2010/0192224 A1 | 7/2010 | Ferri et al. | | |

OTHER PUBLICATIONS

"Intel® 64 and IA-32 Architectures Software Developer's Manual" Intel Corporation, Mar. 2010, 512 pages.
'Call gate' [online]. Wikipedia, 2010 [retrieved on Mar. 10, 2011]. Retrieved from the Internet: <URL: http://en.wikipedia.org/wiki/Call_gate>.
"x86 Assembly Language Reference Manual." Sun Microsystems, Inc., 1995, 204 pages.
Yee, Bennet et al. "Native Client: A Sandbox for Portable, Untrusted x86 Native Code." Google Inc., 2009, 15 pages.

(Continued)

*Primary Examiner* — Christopher Revak
(74) *Attorney, Agent, or Firm* — Wolfe-SBMC

(57) ABSTRACT

Methods, systems, and apparatus, including computer programs encoded on a computer storage medium, for enveloping a thread of execution within an IDT-based secure sandbox. In one aspect, embodiments of the invention provide that a request is received from an application, the request being generated using an application programming interface of a device driver. After the request is received a call gate descriptor for a call gate is added to a segment descriptor table for the application. The call gate descriptor specifies: (a) that the call gate can be called from a first privilege level of the application; and (b) that the call gate requests a second privilege level higher that the first privilege level. A call gate selector for the call gate descriptor is provided to the application in response to the request.

20 Claims, 8 Drawing Sheets

(56) References Cited

OTHER PUBLICATIONS

Banginwar, Rajesh et al. "Sandboxer: Light-Weight Application Isolation in Mobile Internet Devices." Linux Symposium, 2009, 12 pages.

'Adobe to Use Sandbox to Secure Reader' [online] PC Magazine, Ziff Davis, Inc., 2010 [retrieved on Mar. 10, 2011]. Retrieved from the Internet: <URL: http://www.pcmag.com/article2/0,2817,236675,00.asp>.

'Adobe Reader X—Sandbox' [online] Internet Storm Center, SANS Technology Institute, 2010 [retrieved on Mar. 10, 2011]. Retrieved from the Internet: <URL: http://isc.sans.edu/diary.html?storyid=9976>.

'Google updates Chrome to sandbox PDF files' [online]. The Inquirer, Incisive Media Investments Limited, 2010 [retrieved on Mar. 10, 2011]. Retrieved from the Internet: <URL: http://www.theinquirer.net/inquirer/news/1929984/google-updates-chronitc-sandbox-pdf-files>.

'Extracting scripts and data from suspect PDF files' [Online]. Internet Storm Center, SANS Technology Institute, 2008 [retrieved on Mar. 10, 2011]. Retrieved from the Internet: <URL: http://isc.sans.edu/diary.html?storyid=4726>.

Crowly, Chris, 'The Purpose and Application of Virtualization Technology' [online]. The SANS Institute, 2008 [retrieved on Mar. 10, 2011]. Retrieved from the Internet: <URL: http:www.sans.org/security-resources/security_plus/virtualization_sp08.php>.

* cited by examiner

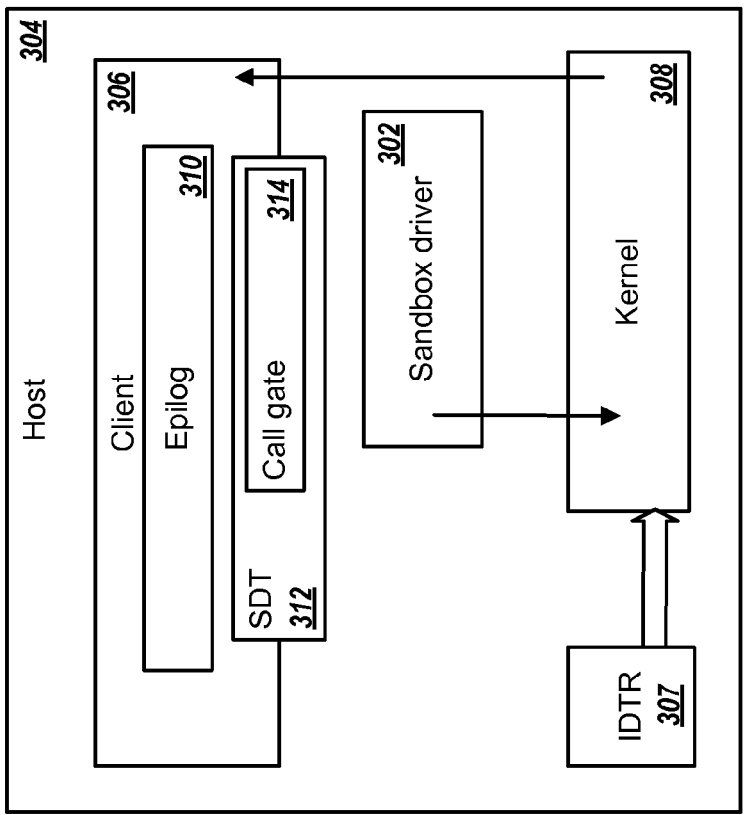
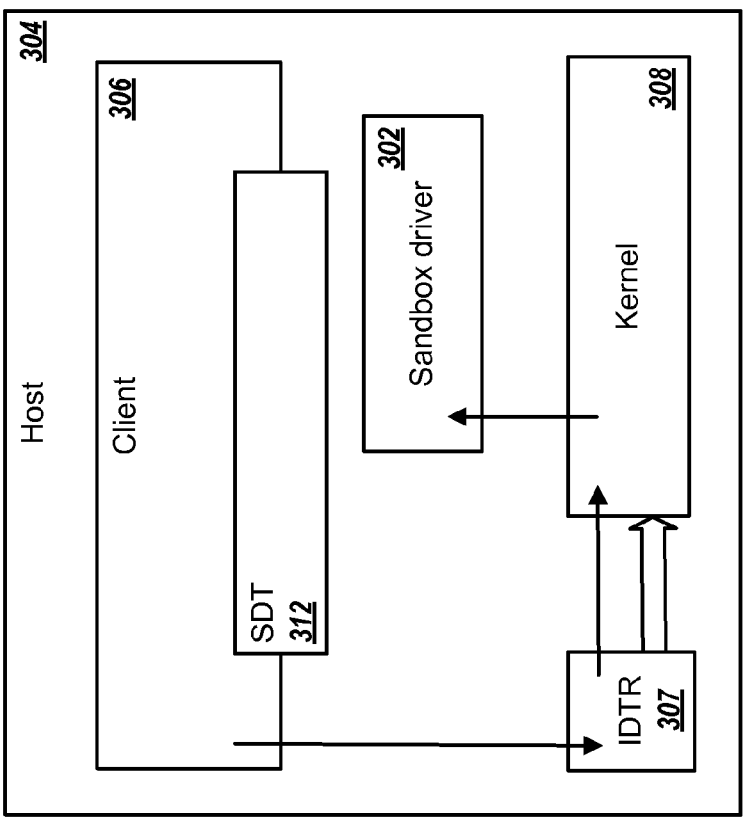
FIG. 3B
FIG. 3A

USING A CALL GATE TO PREVENT SECURE SANDBOX LEAKAGE

BACKGROUND

This specification relates to the use of a call gate to prevent a secure sandbox from leaking.

Secure execution of software applications is important in all computer systems. For example, bugs in an application's code, bugs in third party libraries and bugs in an operating system can open up the application to a security attack. Executing a thread in a secure sandbox provided by a host might prevent untrusted code from performing malicious activities on the host. Sandboxing can allow a thread to execute in a secure environment included in a computing system. One or more applications executing on the computing system may need to execute identified untested or untrusted code securely. For example, a computing system can enable and use a secure sandbox to execute the identified untested or untrusted code. The computing system can execute the identified code separately from other code in order to prevent the identified code from performing unwanted or, in some cases, malicious tasks in the computing system. A client application running on a host computing system can set up the secure sandbox and use it to execute the identified code. The secure sandbox can monitor the execution of the thread while providing a controlled set of resources for use by the thread. For example, a sandbox can allow a client application to securely execute a thread running applications downloaded from the Internet or third party libraries. In addition, an application that accesses and uses untrusted data can be potentially open to security attacks. The use of a sandbox can isolate and prevent the security attacks from affecting a host computer system.

A processor uses one or more interrupt descriptor tables (IDTs) to decide what to do when an interrupt occurs. In situations where more than one IDT has been created, an IDT register (IDTR) can be included in a host computing system to point to the current IDT, such as a standard or default IDT. Moreover, a device driver can modify the IDTR to instead point to another IDT, such as a custom IDT. This can allow untrusted code to operate in a secure sandbox without having access to the operating system kernel. However, in cases where the device driver passes control to the operating system kernel in order to execute trusted code, the kernel may decide to switch tasks instead of returning control to the device driver. If this happens, the other task would then be using the custom IDT. This may be considered an unwanted leaking of the sandbox from having previously included only the untrusted code to now also including trusted code.

In some situations, in order to run untrusted code securely, a second copy is made of the operating system and a secure sandbox for executing the untrusted code is included and executed in the second copy of the operating system. This requires two versions of the operating system.

In some situations, applications running on a host computing system (e.g., anti-virus software and rootkits) may modify a system service dispatch table (SSDT) (e.g., the Windows System Service Dispatch Table included in the Windows Operating System) in order to run untrusted code in a secure sandbox. However, if another thread attempts to enter the operating system kernel while the SSDT is in a modified state, an operating system error may occur that can result in the shutdown of the host computing system.

Therefore, there exists a need to allow a host computing system to run untrusted code in a secure sandbox while allowing trusted code to execute in the operating system kernel without the possibility of the operating system flagging an error and without the need for two versions of the operating system.

SUMMARY

In one aspect, embodiments of the invention provide that a request is received from an application, the request being generated using an application programming interface of a device driver. After the request is received a call gate descriptor for a call gate is added to a segment descriptor table for the application. The call gate descriptor specifies: (a) that the call gate can be called from a first privilege level of the application; and (b) that the call gate requests a second privilege level higher that the first privilege level. A call gate selector for the call gate descriptor is provided to the application in response to the request.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A-B are block diagrams illustrating an example of the addition of a call gate to the SDT for the client application of FIG. 1.

Like reference numbers and designations in the various drawings indicate like elements.

DETAILED DESCRIPTION

Figure 1:
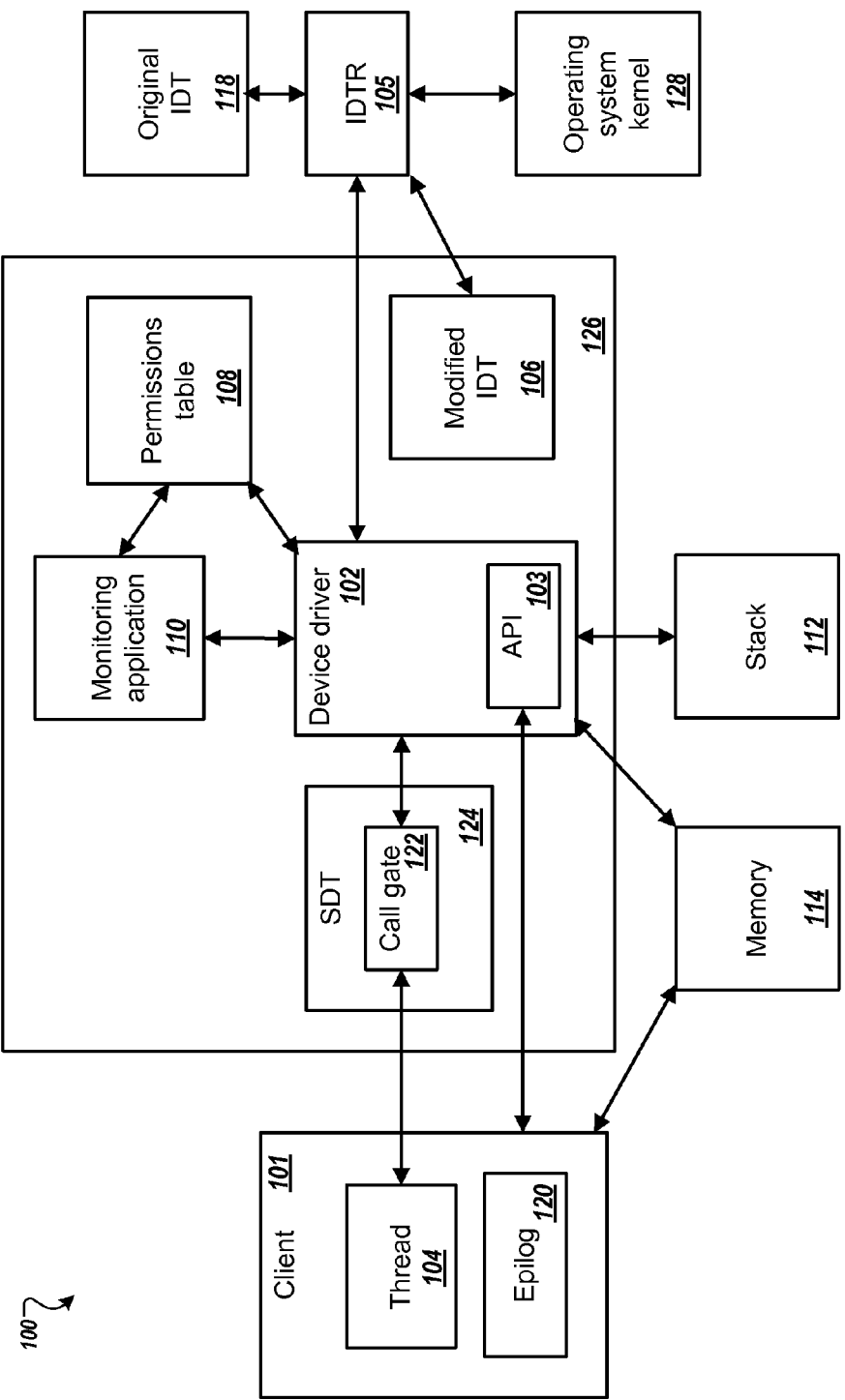
FIG. 1 is a block diagram illustrating an example of a computing system that can be used for enveloping a client application's thread of execution within an IDT based secure sandbox.

This specification describes technologies relating to the use of a secure sandbox to prevent an application's thread of execution from transferring control to the operating system kernel. For example, embodiments of the subject matter can be implemented to provide a custom device driver call that causes a transition directly from a low privilege level code (e.g., code running at ring 3 on an Intel® x86 platform) to driver-controlled high privilege level code (e.g., code running at ring 0 on an Intel® x86 platform) without having to go through the operating system kernel. The custom device driver call can enable an IDT based secure sandbox. Enabling IDT based secure sandboxing directly after transitioning from the low privilege level code can ensure that the operating system kernel does not switch tasks (e.g., applications) while the sandbox is being enabled. The use of the custom device driver call can prevent the operating system kernel from potentially "leaking" the sandbox to other tasks.

Particular embodiments of the subject matter described in this specification can be implemented so as to realize one or more of the following advantages. An IDT based sandbox can be enabled after using a call gate to transition to driver-controlled code without going through the operating system kernel. A call gate target code can ensure that a virtual memory map remains accurate even if an interrupt is issued after the call gate target code is called but before interrupts are disabled. Returning directly to the caller after the sandbox is enabled insures that the operating system kernel cannot execute other tasks in the context of the sandbox. Operating system virtualization can be implemented, for example such that a monitoring application translates non-native interrupts (e.g., MS-DOS) to analogous native operating system (e.g., OS/X) interrupts for execution by the native operating system.

This document describes systems and techniques in which a device driver provides an application program interface (API) that a client application can call to implement a secure sandbox. A secure sandbox can allow a client application to run one or more threads of execution in a secure environment included in a computing system. The sandbox can provide a secure computing environment (e.g., memory and resources separate from the main operating environment) for execution of the identified thread. The secure environment provided by the sandbox can execute a thread in an environment that is isolated from the operating system kernel as well as additional operating system specific registers. The isolation can prevent the thread from executing malicious code that could cause damage to the operating system kernel and the host computing environment as the thread cannot have direct access to the operating system kernel functions.

As will be described in more details below, also in conjunction with FIGS. 1 through 8, the sandbox is implemented using redirection based on an IDT. The IDT can be a table provided in the memory of a host computing environment that includes a list of pointers to interrupt service routines. The use of a standard device driver call that goes through the operating system kernel to enable the IDT-based secure sandbox may allow the operating system kernel to switch tasks while the secure sandbox is enabled. Allowing the kernel to switch tasks while an IDT-based sandbox is enabled could result in the sandboxing of another, different task, unrelated to the identified task that initially made the device driver call to enable the IDT-based secure sandbox.

As will be described in more detail below, also in conjunction with FIGS. 1-8, the client application calls the API via the standard way of calling device driver APIs on the operating system that is being used (e.g., Microsoft Windows or Apple's OS/X). Optionally, depending on the operating system architecture, the API maps memory referred to as the "call gate target code" into the virtual memory maps for both the client application and the kernel at the same virtual address in both tasks. The API adds a call gate descriptor to the segment descriptor table (SDT) for the client application. The call gate descriptor specifies the address in the virtual memory map as the target address for the call gate. The call gate descriptor also specifies that it can be called from ring 3; specifies that it requests privilege level of ring 0; and points to a target code segment that has a privilege level of ring 0 and the maximal address mapping. The device driver then returns the call gate selector to the client application.

As will be described in more detail below, also in conjunction with FIGS. 1-8, the client application can then make a far call using the call gate selector as the segment and using zero for the offset. The offset is ignored by the x86 chip when a call gate is used. The chip then transitions into ring 0 and switches to the code segment and offset specified by the call gate, which together point to the call gate target code.

As will be described in more detail below, also in conjunction with FIGS. 1-8, the call gate target code disables interrupts on entry with the x86 clear interrupt (cli) instruction. However, an interrupt (such as a timer interrupt) could be generated after the far call to the call gate target code but before the cli that disables interrupts. Moreover, on some operating systems when an interrupt is processed in ring 0, the virtual memory map is not restored upon return from the interrupt handler. In such cases, the call gate target code can therefore check and if necessary restore the value of the CR3 register to point to the physical address of the virtual memory map for the client task. The call gate target code then modifies the stack so that it can return to the caller via a return from interrupt (iret) instead of a long return (lret). The call gate target code then enables IDT based redirection and returns directly to the client.

In some implementations described herein, the IDT based redirection is performed to provide sandboxing of one or more execution threads. That is, a client application that wants to envelop an execution thread can do so with a sandbox that makes use of an interrupt descriptor table (IDT). Particularly, the client application can make a call to a device driver which in response changes an IDTR so that interrupts are redirected to driver-controlled code while the untrusted sandboxed thread is executing. Other kernel entry instructions, for example system call instruction ("syscall") and system enter instruction ("sysenter") instructions, can be similarly redirected. Examples below will illustrate that the client application can make such a call to the device driver without involving the operating system kernel. Once established, the sandbox can provide selective redirection of interrupts and/or other system calls.

For example, any call from the sandboxed thread to the operating system is trapped by the driver, which can then decide to ignore or filter the call, or shut down the sandboxed thread. When the driver detects an interrupt or syscall/sysenter that should be passed on to the kernel (such as an approved operating system call or a timer interrupt), the driver can perform the necessary operations to let the call through. For example, the driver restores the IDTR to an original value supplied by the operating system, modifies the stack to insure that control will be returned to the driver after the interrupt or syscall/sysenter is processed, and then passes control to the operating system kernel. After the kernel has finished processing the interrupt or syscall/sysenter, control is passed to the code at an address injected by the driver into the stack. In such implementations, the driver-provided code then re-enables the security sandbox, and thereafter the driver returns control to the sandboxed client code at the point where the original interrupt or syscall/sysenter occurred.

In some implementations, the IDT can include an array of descriptors stored in memory included in a computing system. An interrupt vector can index the IDT. A descriptor can point to a memory location that includes code to execute in response to the receiving of an interrupt. For example, the descriptor can point to a code segment where an interrupt service routine resides. In addition, the descriptor can point to where in the code segment the interrupt service routine begins. Interrupts can include, but are not limited to, hardware interrupts, software interrupts, maskable interrupts and nonmaskable interrupts. For example, when an interrupt occurs in a computing system, an interrupt vector value is determined based on the interrupt value and the descriptor byte size. For example, the interrupt value can be a numerical value. The interrupt vector indexes the IDT to determine a descriptor associated with the interrupt. The descriptor's type and contents can determine the actions taken by the computing system based on the interrupt. In addition, the IDTR includes the base address for the IDT and the length (e.g., in bytes) for the IDT.

For example, in the Microsoft MS-DOS operating system, when mouse movement is detected, the computing system generates a mouse interrupt (INT 33h). The interrupt vector value is determined and used to index the IDT. The associated descriptor determines what kernel code will execute to perform the actions (movement of the cursor) in response to the receipt of the interrupt.

In some implementations, an operating system kernel can use the IDT to isolate itself from operating system calls made by a client application. The application may not access operating system functions without going through the IDT. The IDT can serve as a gateway between the thread and the operating system kernel.

In addition, in some implementations, an application can execute operating system calls such as a "fast" system call (e.g., a syscall or a sysenter). Alternatively, an operating system can use an interrupt with a specific value (e.g., 2Eh) as an operating system entry point for the system calls. The thread executing in the sandbox can use these techniques to make a system call to request a service from the operating system's kernel that the thread may not have permission to run.

FIG. 1 is a block diagram illustrating an example of a computing system 100 that can be used for enveloping a client application's thread of execution within an IDT based secure sandbox. A sandbox manager 126 can enforce secure sandbox constraints on a client thread. For example, the computing system 100 can be referred to as a host. Such a secure sandbox can prevent the execution of a thread 104 from transferring control directly to an operating system kernel 128. As a consequence, the sandboxed thread (e.g., thread 104) cannot exploit operating system or host application bugs. As another example, the secure sandbox can reduce the privileges under which the sandboxed thread 104 executes as compared to the privileges the thread 104 would have if executed outside of the sandbox.

In some implementations, a client application 101 can generate an instance of the thread 104. The client application 101 can determine that the thread 104 should execute in a secure environment based on the functions called in the thread 104. For example, if the client application 101 determines that the functions called in the thread 104 are from an unidentified third party (e.g., code downloaded from the Internet) there is the potential that the functions could perform malicious operations in the computing system.

Referring to FIG. 1, the computing system 100 can execute one or more client applications (e.g., client application 101). The client application 101 can include trusted code that can be executed by the computing system 100. The client application 101 can access code from a variety of additional sources (e.g., the Internet, third party libraries) both known and unknown to the computing system 100. For example, the client application 101 can open a formatted text file (not shown) for viewing by a user. The text file may originate from a source unknown to the client application 101 (e.g., a web site). The client application 101 does not have knowledge of the content of the file or its origin. The client application 101 can determine that the code for opening the file be run in a thread 104 in a secure sandbox. In another example, a client application may use a third party library (not shown) to print the contents of a file. Since the library is from an outside source, the client application 101 is unaware of its contents and may decide to run a thread 104 for the code to print the file in the secure sandbox.

The client application 101 can generate one or more threads 104. For example, each thread (e.g., thread 104) can be an instance generated for the execution of at least one task or operation for the client application 101. The client application 101 can be configured so that one or more instructions or function calls in the thread 104 should be executed in a secure environment. The client application 101 can therefore initiate execution of the thread 104 in the secure sandbox. To do so, the client application 101 can first generate a traditional kernel-mediated system call to the device driver 102 that can set up a call gate 122. The client application 101 can then call directly into the device driver 102 by way of the call gate 122 in order to envelop the execution of the thread 104 in an IDT-based sandbox. In other words, the device driver 102 can enable a sandbox process for the execution of the thread 104. By way of analogy, the sandbox process can be seen as switching "on" a monitoring step for the execution of the thread 104, and the monitoring step can be switched "off" when the sandboxing is no longer needed.

If the operating system kernel 128 were to mediate the device driver call from the client application 101 to the device driver 102, the operating system kernel 128 would also mediate the return path from the device driver 102 to the client application 101. In some situations, however, the operating system kernel 128 could then choose to switch tasks (applications), for example to service an asynchronous trap, in the process of returning control from the device driver 102 to the client application 101. This could result in the sandboxing of one or more different, unrelated tasks, in effect "leaking" the sandbox to the different task(s). As a result, the different task may be prevented from performing operations not allowed by the secure sandbox.

To avoid that the operating system kernel 128 switches tasks, the client application 101 here calls an application program interface (API) 103 provided by the device driver 102. The API 103 installs the call gate 122 and allows the execution of the device driver code for the device driver 102 and the return from the device driver 102 to the client application 101 without going through the operating system kernel 128. In some implementations, the client application 101 can then use the call gate 122 included in a segment descriptor table (SDT) 124 included in memory in the computing system 100. For example, the SDT 124 can be a local descriptor table. In another example, the SDT 124 can be a global descriptor table. The call gate 122 can be specified by a call gate descriptor in the SDT 124. The call gate 122 can allow the client application 101 to directly enter and exit the device driver 102 without involving the operating system kernel 128. For example, the call gate 122 can allow the low privilege level code of the client application 101 to transition to the high privilege level code of the device driver 102.

In response to the call from the application to enable the sandbox, the device driver 102 modifies an IDTR 105 to include a base address for a modified IDT 106. The IDTR 105 includes the base address for the modified IDT 106 and the length (e.g., in bytes) for the IDT 106. The device driver 102 can store the original value of the IDTR 105, for example, in memory 114 included in the computing system 100, prior to modifying the value of the IDTR 105. The original value of the IDTR 105 can be the value of the IDTR 105 set by the operating system when the computing system 100 is initialized (e.g., at system boot). The modified IDT 106 includes an array of descriptors where each descriptor points to a memory location that includes code, controlled by the device driver 102, to execute in response to the receiving of specific interrupts identified by the device driver 102. The device driver 102 can access a permissions table 108 that includes interrupt values (e.g., numerical values) and system call values that the driver can identify and permit. The permissions table 108 can be included in memory in the computing system 100.

The permissions table 108 can be created prior to the sandboxing of the thread 104. In some implementations, the device driver 102 can be compiled with the permissions table 108 in order for the permissions table 108 to be included with the device driver 102 and therefore loaded with the device driver 102. In some implementations, the client application (e.g., client application 101) that generates and sandboxes the thread 104 can specify the contents of the permissions table 108. In some implementations, one or more additional, different applications (not shown) running on the computing system 100 can specify the contents of the permissions table 108 prior to the running of the application that generates the thread 104. In some implementations, the contents of the permissions table 108 may be included in pre-programmed memory included with the computing system.

In implementing the secure sandbox, the client application 101 makes a call to the operating system in order to tell the device driver 102 via the API 103 to install the call gate 122. The operating system kernel 128 mediates and executes the device driver call and the device driver call returns from the device driver 102 through the operating system kernel 128 to the client application 101.

In some implementations, a sandbox can provide an environment for implementing operating system virtualization in a native operating system (e.g., OS/X). For example, the sandbox can run a virtual operating system that includes a monitoring application. The monitoring application can translate non-native operating system (e.g., MS-DOS) interrupts to analogous native operating system (e.g., OS/X) calls or interrupts for execution by the native operating system.

Figure 2:
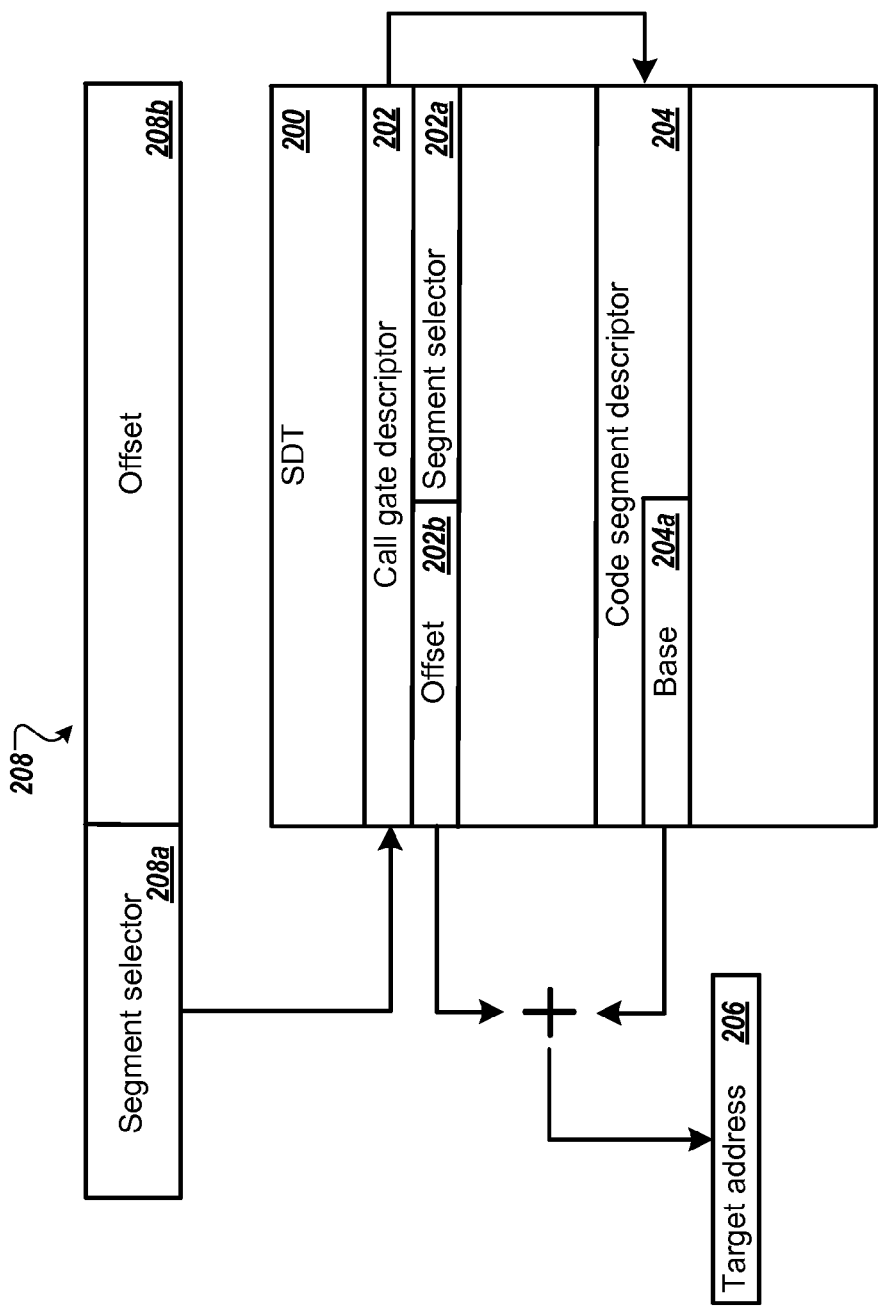
FIG. 2 is a block diagram illustrating an example of the segment descriptor table (SDT) of FIG. 1.

FIG. 2 is a block diagram illustrating an example of a segment descriptor table (SDT) 200 (e.g., the SDT 124 described in examples above). For example, each process executed by an operating system kernel 128 can have a segment descriptor table. The SDT 200 can include segment descriptors. Here, a call gate descriptor 202 and a code segment descriptor 204 are shown. The operating system can switch the current SDT when scheduling a new process.

The call gate 122 can be a mechanism that allows the computer system 100 to transition from one code segment to another. The call gate 122 can specify the destination of the transition (the address of a code segment to access). In addition, the call gate 122 can define an entry point for a procedure included in a specified code segment. For example, the Intel® x86 architecture can provide a segment descriptor table and a call gate.

The call gate descriptor 202 can include a compound destination address that includes a segment selector 202a and an offset 202b. The segment selector 202a can be an index to the code segment descriptor 204 included in the SDT 124. The call gate descriptor 202 can specify the required privilege level for a caller trying to access the procedure. The offset 202b can be used along with a base 204a to calculate a target address 206. The target address 206 is the address in memory of the location of the procedure entry point.

An application can make a far call to the address included in a far pointer 208 in order to access the call gate descriptor 202. The far call can use the far pointer 208 that includes a segment selector 208a and an offset 208b. The segment selector 208a can be an index to the call gate descriptor 202. For example, when implemented by the Intel® x86 architecture, the offset is required but not used by the computing system.

Referring to FIGS. 1 and 2, the client application 101 can call the API 103 provided by the device driver 102. The client application 101 can call the device driver API 103 when initially entering the device driver 102. The API 103 can map a portion of the memory 114 included in the computing system 100 into a virtual memory map for use by the client application 101 and the operating system kernel 128. The mapped virtual memory can be at the same virtual memory address accessed by both the client application 101 and the operating system kernel 128. The memory can include call gate target code.

The client application 101 can have a segment descriptor table (e.g., SDT 124). The API 103 can add a call gate descriptor (e.g., call gate 122 represented by call gate descriptor 202) to the SDT 124. The call gate descriptor 202 can be a compound destination address that includes the segment selector 202a and the offset 202b. In addition, the call gate descriptor 202 can specify the allowable privilege level for the caller (the client application 101) as a low privilege level (e.g., ring 3 on an Intel® x86 platform). The segment selector 202a can specify that the caller (the client application 101) requests a higher privilege level (e.g., ring 0 on an Intel® x86 platform) in order to execute the call gate target code. The call gate descriptor 202 points to a target code segment used by the call gate target code that has a higher privilege level (e.g., ring 0 on an Intel® x86 platform) than the client application 101 and zero for the address base and the maximum value for the address limit. The call gate descriptor 202 along with the code segment descriptor 204 provides the target address 206 for the call gate 122 as the virtual memory address established by the device driver API 103 for both the client application 101 and the operating system kernel 128. The device driver 102, using the device driver API 103, returns the segment selector 208a in the SDT 124 to the client application 101.

Continuing to refer to FIGS. 1 and 2, the client application 101 can choose to sandbox a thread of execution (e.g., thread 104). The client application 101 can request the sandboxing using the call gate 122. The client application 101 can make a far call to the call gate 122 using the returned segment selector 208a. For example, when the call gate 122 is implemented on an Intel® x86 platform, the client application 101 can set the offset 208b equal to zero as the offset 208b is not used when accessing a call gate descriptor (e.g., call gate descriptor 202) included in a segment descriptor table (e.g., SDT 124). The call gate 122 accesses the device driver 102 to enable the IDT-based sandbox in the manner previously described. The use of the call gate 122 directly accessing the device driver 102 eliminates the use of the operating system kernel 128 in enabling the secure sandbox for the requested task (e.g., thread 104). In order to enable the secure sandbox without the use of the operating system kernel 128, the call gate 122 can switch the privilege level from the low privilege level (e.g., ring 3 on an Intel® x86 platform) of the caller (the client application 101) to the higher privilege level (e.g., ring 0 on an Intel® x86 platform) indicated by the call gate segment selector 202a. The call gate descriptor 202 along with the code segment descriptor 204 determines the target address 206 for the call gate 122 as the virtual memory address established by the device driver API 103. The device driver 102 can then execute the call gate target code to enable the secure sandbox for the thread 104. Once the sandbox is enabled, the device driver 102 can return control directly to the client application 101.

Referring again to FIG. 1, the following are examples illustrating operations that can be performed when the secure sandbox managed by the sandbox manager 126 has been established. While monitoring the execution of the thread 104 in the secure sandbox, the device driver 102 identifies and traps a call into the operating system. A call into the operating system can include an interrupt instruction (an interrupt) or an operating system instruction (e.g., sysenter or syscall). In some implementations, the device driver 102 determines, by accessing the permissions table 108, that the trapped call is an interrupt whose value is not included in the permissions table 108. Interrupt values and system call values not included in the permissions table 108 are operating system calls whose service routines must be executed within the secure sandbox. In some implementations, this can be done by the device driver 102 passing the trapped call (e.g., the interrupt value) to a monitoring application 110. The monitoring application 110 can determine, by accessing the permissions table 108, that the trapped call is an interrupt whose value is included in the permissions table 108. The monitoring application 110 can then inform the device driver 102 to permit the trapped call (e.g., the interrupt).

In order for the thread 104 to execute the interrupt, the hardware saves the return address and the flag register on a stack 112. The hardware uses the previously modified IDTR 105 to access the modified IDT 106 in order to run the associated replacement code provided by the device driver 102 to perform the function for the trapped call. In a sense, the modified IDT 106 can serve as a gateway between the thread 104 and the device driver 102. In some implementations, the replacement code can be compiled with and embedded in the device driver 102.

Once the execution of the replacement code is complete, the device driver 102 returns control to the thread 104 at the point where the call into the operating system occurred. Thread execution proceeds with the device driver 102 continuing to monitor the execution of the thread 104.

In some implementations, the device driver 102 determines that the trapped call is a fast call instruction (e.g., a syscall or a sysenter). As described, the thread 104 executes the fast call in the secure sandbox in a similar manner as an identified interrupt.

While continuing to monitor the execution of the thread 104, the device driver 102 identifies and traps another call into the operating system. In contrast to the example above, the device driver 102 now determines that the trapped call is an interrupt whose value is included in the permissions table 108. Interrupt values included in the permissions table 108 are interrupts whose service routines are flagged for execution outside of the secure sandbox and can be executed by the operating system kernel 128. In some implementations, this can be done by the device driver 102 passing the trapped call (e.g., the interrupt value) to a monitoring application 110. The monitoring application 110 can determine, by accessing the permissions table 108, that the trapped call is an interrupt whose value is included in the permissions table 108. For example, the interrupt may be a timer interrupt or a page fault interrupt. The interrupt service routines for these interrupts can include trusted operating system code for execution by the operating system kernel 128. The monitoring application 110 can then inform the device driver 102 that the trapped call (e.g., the interrupt) can be passed directly to the operating system kernel 128.

In order for the thread 104 to execute the interrupt, the hardware saves its return address and flag register on a stack 112. The device driver 102 restores the IDTR 105 to the original value supplied by the operating system. For example, the device driver 102 can access the saved value of the IDTR from the memory 114 and place it into the IDTR 105. The replacement of the IDTR 105 with its original value effectively disables the secure sandbox. In addition, the device driver 102 modifies the stack 112 by replacing or modifying the return address used by the hardware as the return address for the interrupt. The replaced or modified return address can point to code (epilog 120) mapped into the client application 101 address space by the device driver 102 that requests the re-enabling of the secure sandbox using the call gate 122 provided by the device driver 102 once the interrupt service routine has been executed.

The device driver 102 passes control to the operating system kernel 128. At this point, the thread 104 is no longer executing in the secure sandbox. In effect, the operating system can behave as if the device driver 102 has not been loaded or implemented. The device driver 102 uses the original operating system provided IDT 118 in order to look up and jump to kernel-mode code to perform the function for the interrupt (e.g., execute the interrupt service routine). Once the execution of the kernel-mode code for the interrupt is complete, execution control for the thread 104 is returned to the code in the epilog 120, which is pointed to by the address stored on the stack 112. The code included in the epilog 120 uses the call gate 122 to request the enabling of the secure sandbox (effectively re-enabling the secure sandbox) for continued execution of the thread 104. For example, the epilog code, when executed, calls the call gate 122 in order to re-enable the secure sandbox. The device driver 102 returns control to the thread 104 at the point where the now serviced interrupt occurred. The thread 104 retrieves its previously stored status and flag registers from the stack 112. Thread execution proceeds with the device driver 102 continuing to monitor the execution of the thread 104.

In some implementations, a client application can create a separate process in which to run a sandboxed thread. Such a sandboxed thread is prevented from accessing data and code included in the client application because the sandboxed thread is running in a separate process from the client application. The separation of the processes can further protect the host from the effects of executing untrusted code. The client application and the sandboxed thread can communicate using shared memory, memory-mapped files and custom software interrupts mediated by a monitoring application, for example along the lines of the above examples.

While continuing to monitor the execution of the thread 104, the device driver 102 in this example identifies and traps yet another call to the operating system. In this example, the device driver 102 determines, by accessing the permissions table 108, that the trapped call is an interrupt instruction or an operating system instruction that mandates the shutdown of the sandboxed thread 104. For example, an operating system instruction may involve access to data restricted to the thread 104 or data that the thread 104 is not permitted to access. In this example, the device driver 102 can call the operating system kernel 128 to terminate the thread 104. In another example, an interrupt may attempt to perform a read operation from an input device that could introduce malicious data into the client application 101. The device driver 102 can request the kernel 128 shutdown the thread 104 to prevent the input read operation.

FIGS. 3A-B are block diagrams illustrating an example of the addition of a call gate (e.g., call gate 314) to a segment descriptor table (e.g., SDT 312) for a client application (e.g., client application 306). For example, referring to FIG. 3A, a host 304 can host a client application 306 that can have a segment descriptor table (e.g., SDT 312). The client application 306 can generate an instance of a thread (e.g., thread 104) it would like to run in a secure environment. The client application 306 may call a sandbox driver 302 to add a call gate 314 to the SDT 312 for use in enabling a secure sandbox for the execution of the thread (e.g., thread 104). The client application 306 can generate an interrupt or fast call to the operating system kernel 308 for a device driver (e.g., device driver 102) that can be included in the sandbox driver 302. Referring to FIG. 1, the sandbox driver 302 can include the device driver 102, the stack 112, the monitoring application 110, the permissions table 108, and the modified IDT 106. An IDTR 307 (e.g., IDTR 105) included in the host 304 can point to an IDT (e.g., original IDT 118) to determine the kernel-mode operating system function included in an operating system kernel 308 to execute in order to access the device driver (e.g., device driver 102) included in the sandbox driver 302.

Referring to FIG. 3B, the device driver 102 can include an API that can enable the device driver 102 to establish a call gate 314 in the SDT 312 of the client application 306. The sandbox driver 302 maps the epilog 310 into the virtual memory map of the client application 306. The epilog 310 includes code that can request the enabling of the secure sandbox by the device driver 102 included in the sandbox driver 302. The segment selector for call gate 314 is returned by the API of the device driver (e.g., device driver 102) included in the sandbox driver 302. Once the call gate 314 is established, the operating system kernel 308 can return control to the client application 306.

As shown in FIG. 3B, the IDTR 307 is not modified and remains pointing to the original IDT included in the operating system kernel 308. As such, the secure sandbox is not yet enabled. If the operating system kernel 308 switches tasks (e.g., to service an asynchronous trap) while returning control back to the client application 306, the different "switched to" task will not be executed in a secure sandbox as the secure sandbox has not yet been established.

Figure 4B:
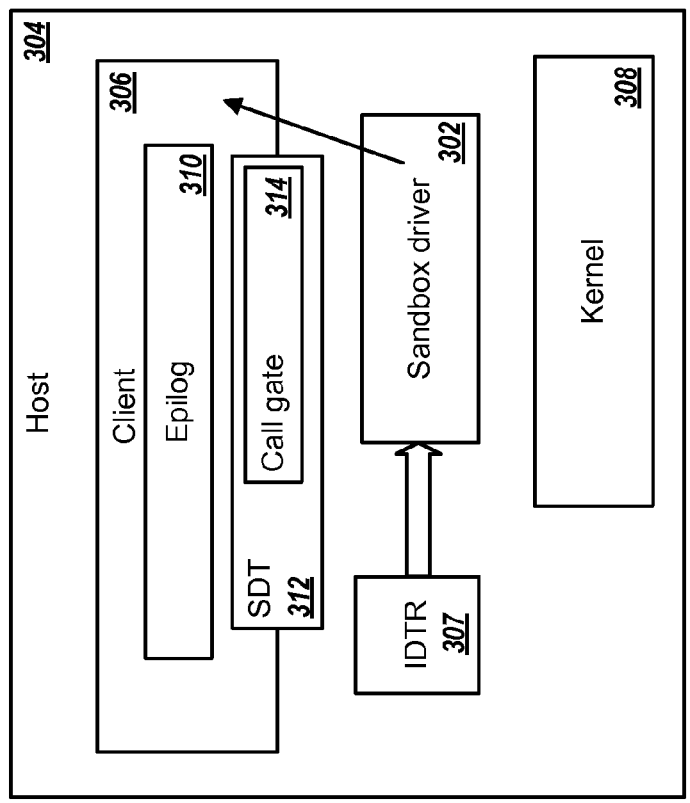
FIGS. 4A-B are block diagrams illustrating an example of a request to enable a sandbox using the call gate of FIGS. 3A-B.
Figure 4A:
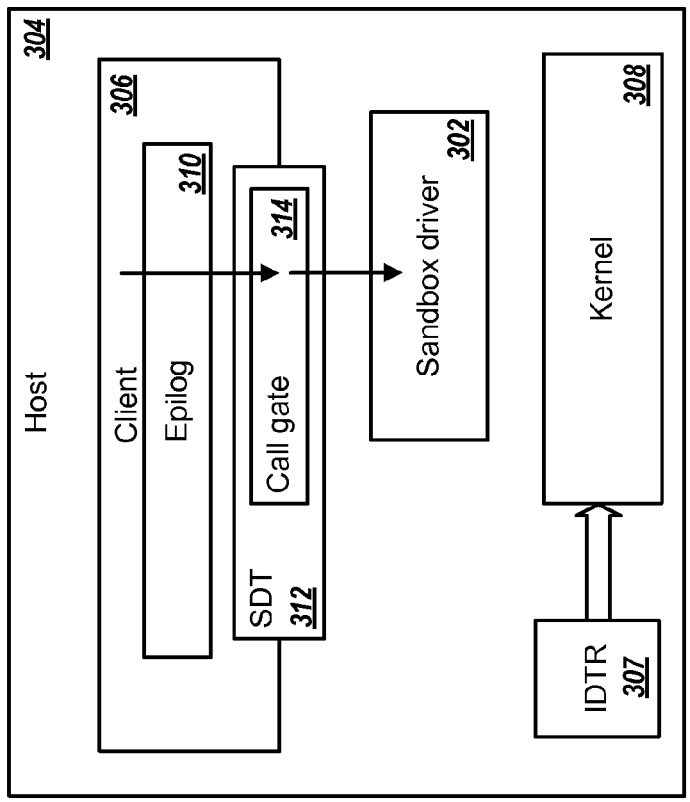

FIGS. 4A-B are block diagrams illustrating an example of a request to enable a sandbox using a call gate (e.g., call gate 314). For example, referring to FIG. 4A, the client application 306 can generate an instance of a thread (e.g., thread 104 in FIG. 1) it would like to run in a secure environment. The client application 306, having already established a call gate 314 in the SDT 312, can access the device driver (e.g., device driver 102) included in the sandbox driver 302 using the call gate 314 in order to enable the secure sandbox.

Referring to FIGS. 1, 2 and 4A, SDT 200 is an example of an SDT 312 for use with the client application 306. The client application 306 can make a far call to the sandbox driver 302 using the call gate segment selector (e.g., call gate segment selector 208a returned to the client application 306 when the device driver established the call gate 314). The call gate 314 accesses the device driver 102 included in the sandbox driver 302 in order to enable the IDT-based sandbox. The call gate 314 can switch the privilege level from the low privilege level (e.g., ring 3 on an Intel® x86 platform) of the caller (the client application 306) to the higher privilege level (e.g., ring 0 on an Intel® x86 platform) indicated by the code segment selector (e.g., segment selector 202a). The call gate descriptor 202 along with the code segment descriptor 204 determines the target address 206 for the call gate 314 as the virtual memory address established by the device driver API 103. The device driver 102 can then execute the code in the call gate target code to enable the secure sandbox for the thread 104.

Referring to FIG. 4B, the device driver 102 modifies the IDTR 307 to include a base address for a modified IDT 106 resulting in an IDT-based sandbox. When the device driver 102 completes the enabling of the secure sandbox, the device driver 102 returns control to the client application 306. As shown in FIG. 4B, the operating system kernel 308 is not involved in the enabling of the secure sandbox.

In some implementations, interrupts are enabled when the device driver 102 enters the call gate target code. For example, in an Intel x86 based computing system, the "cli" instruction can be used to disable the interrupts. In some situations, it is possible that an interrupt (e.g., a timer interrupt) can occur between the far call by the client application 306 to the call gate 314 and the entry into the call gate target code and the execution of the "cli" instruction. In some cases, when processing the interrupt at a high privilege level (e.g., ring 0 on an Intel® x86 platform) the operating system kernel may not restore the virtual memory map on return from the interrupt handler for the interrupt. The call gate target code is here mapped into the virtual memory map for both the client application 306 and the operating system kernel at the same virtual address, and the call gate target code checks to make sure the virtual memory map in use is the one for the client 306. If the virtual memory map is not the correct one, the call gate target code can restore the value of the control register (e.g., control register CR3 on an Intel® x86 platform) used by the computing system for virtual addressing to point to the physical address of the virtual memory map for the client application 306. The call gate target code can modify the return address and insert flags on a stack (e.g., stack 112 in FIG. 1 that can be accessed by the sandbox driver 302). The interrupt service routine can then return to the caller (the client 306) using the return from interrupt instruction normally used for returning from the interrupt (e.g., an "iret" instruction to return from an "int" instruction (used for the example timer interrupt) on an Intel® x86 platform).

Modifying the stack to return to the client using "iret" prevents the unwanted switching out of the task identified for sandboxing. Prior to returning, the call gate target code can enable the IDT-based sandbox.

Figure 5:
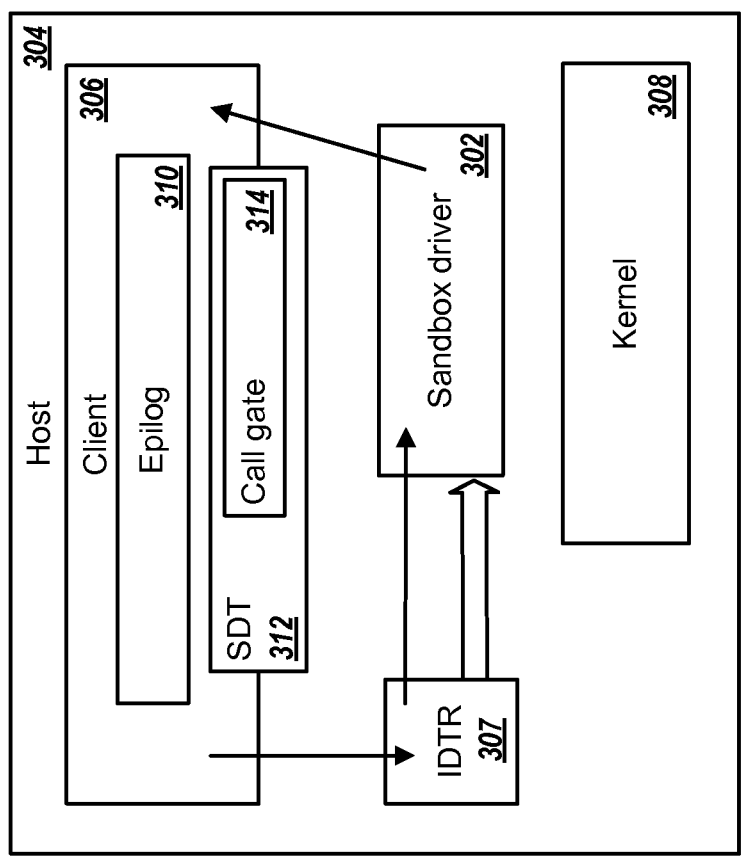
FIG. 5 is a block diagram illustrating an example of the intercepting of an operating system instruction by the sandbox of FIGS. 4A-B.

FIG. 5 is a block diagram illustrating an example of the intercepting of an operating system entry instruction (e.g., an interrupt, a syscall or a sysenter) by an IDT-based sandbox. For example, the host 304 can host the client application 306. The client application 306 can use the call gate 314 included in the SDT 312 to enable the secure sandbox for a thread (e.g., thread 104) of the client application 306 as described with reference to FIGS. 4A-B. A thread (e.g., thread 104) of the client application 306 running in the secure sandbox can make an operating system call. The host 304 uses the modified IDTR 307, which points to the modified IDT 106 included in the sandbox driver 302. The sandbox driver 302 can run the associated code to perform the function for the interrupt where the modified IDT 106, the device driver 102 and the replacement code are included in the sandbox driver 302. As shown in FIG. 5, the operating system call is isolated from the operating system kernel 308. The sandbox driver 302 returns control back to the thread (e.g., thread 104) of the client application 306 running in the secure sandbox once the interrupt service is completed. As such, the code included in the epilog 310 need not be executed as the secure sandbox remains enabled.

Figure 6B:
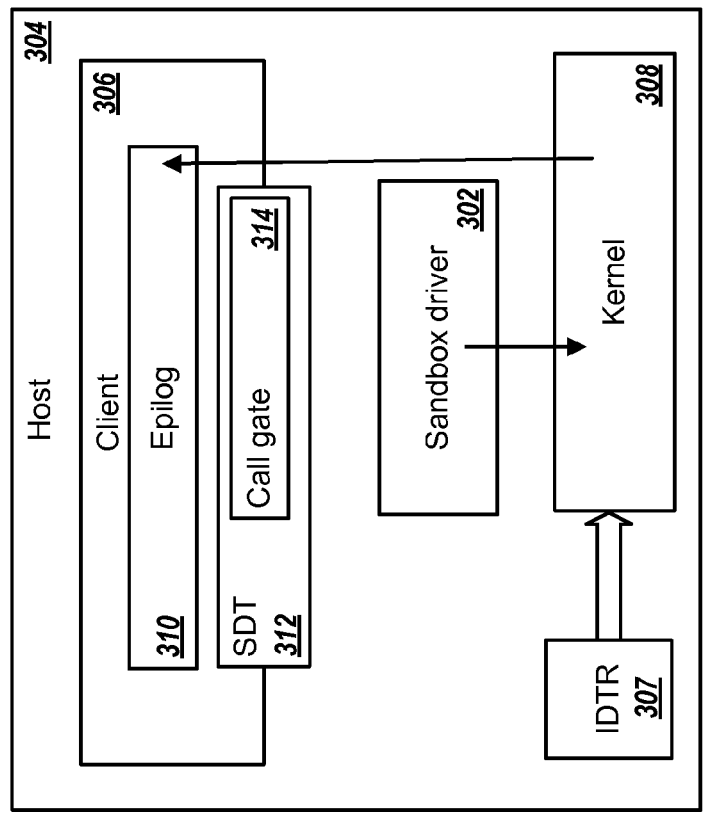
FIGS. 6A-B are block diagrams illustrating an example of the passing of an operating system call by the device driver of FIG. 1 through to the operating system kernel of FIGS. 3-5.
Figure 6A:
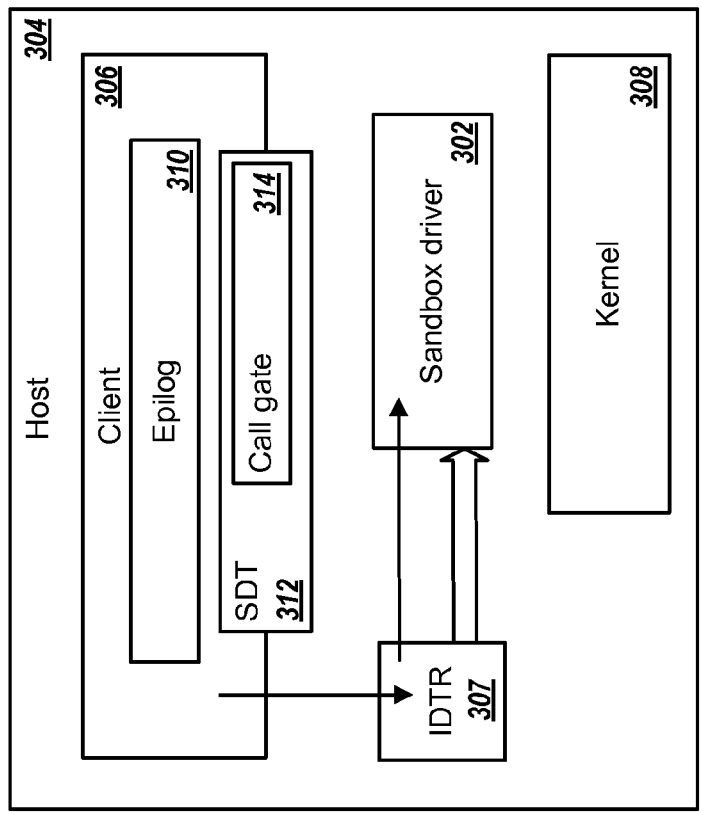

FIGS. 6A-B are block diagrams illustrating an example of the passing of an interrupt by the sandbox driver 302 through to the operating system kernel 308. For example, the host 304 can host the client application 306. The client application 306 can use the call gate 314 included in the SDT 312 to enable the secure sandbox for a thread (e.g., thread 104) of the client application 306 as described with reference to FIGS. 4A-B. Referring to FIG. 6A, the thread (e.g., thread 104) running in the client application 306 makes a call to an interrupt. For example, the interrupt can be a page fault interrupt (e.g., int 14h) that indicates an instruction attempted to access an unpaged memory location. The sandbox driver 302 determines the interrupt (e.g., the page fault interrupt) can be passed on to the kernel 308. Referring to FIG. 6B, the device driver 102 restores the value of the IDTR 307 to the original operating system value. The IDTR 307 points to the original IDT (e.g., original IDT 118) to determine the code for processing the page fault interrupt. The device driver 102 passes control to the kernel 308 to run the page fault interrupt code. In addition, the device driver modifies the stack to include as the return address from the interrupt service, the address of code included in the epilog 310. On completion of the interrupt service, the return address from the stack points to the code in the epilog 310 for re-enabling the sandbox. The sandbox is re-enabled as previously described with reference to FIGS. 4A-B.

Figure 7B:
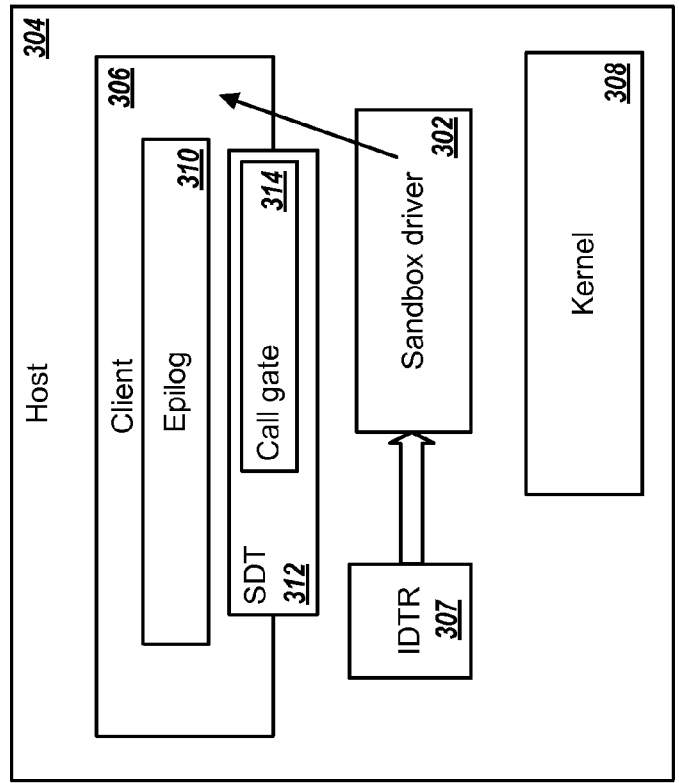
FIGS. 7A-B are block diagrams illustrating an example of re-sandboxing after the IDT-based sandbox of FIG. 5 intercepts an operating system call.
Figure 7A:
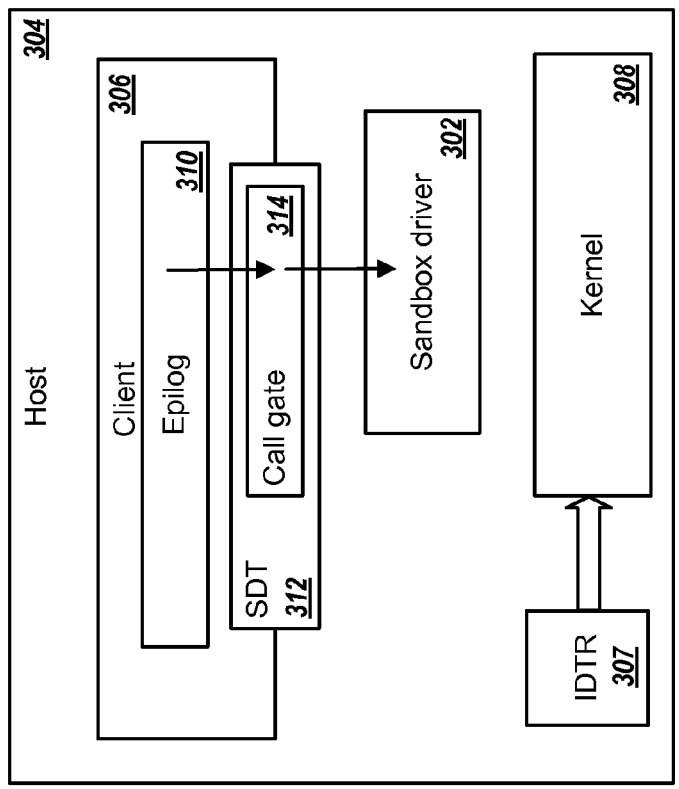

FIGS. 7A-B are block diagrams illustrating an example of re-sandboxing after an IDT-based sandbox intercepts an operating system entry instruction (e.g., an interrupt, a syscall or a sysenter). For example, referring to FIG. 7A, the client application 306 would like to re-enable the secure sandbox in order to run a thread (e.g., thread 104) in a secure environment. The client application 306, having already established a call gate 314 in the SDT 312, can access the device driver (e.g., device driver 102) included in the sandbox driver 302 by way of epilog 310 using the call gate 314 in order to re-enable the secure sandbox.

Referring to FIGS. 1, 2 and 7A, SDT 200 is an example of an SDT 312 for use with the client application 306. The epilog 310 can make a far call to the sandbox driver 302 using the call gate segment selector (e.g., call gate segment selector 208a returned to the client application 306 when the device driver established the call gate 314). The call gate 122 accesses the device driver 102 included in the sandbox driver 302 in order to re-enable the IDT-based sandbox. The call gate 314 can switch the privilege level from the low privilege level (e.g., ring 3 on an Intel® x86 platform) of the caller (the client application 306) to the higher privilege level (e.g., ring 0 on an Intel® x86 platform) indicated by the code segment selector (e.g., segment selector 202a). The call gate descriptor 202 along with the code segment descriptor 204 determines the target address 206 for the call gate 314 as the virtual memory address established by the device driver API 103. The device driver 102 can then execute the code in the call gate target code to re-enable the secure sandbox.

Referring to FIG. 7B, the device driver 102 modifies the IDTR 307 to include a base address for a modified IDT 106 resulting in the re-enabling of the IDT-based sandbox. When the device driver 102 completes the re-enabling of the secure sandbox, the device driver 102 returns control to the client application 306. As shown in FIG. 7B, the operating system kernel 308 is not involved in the re-enabling of the secure sandbox.

Figure 8:
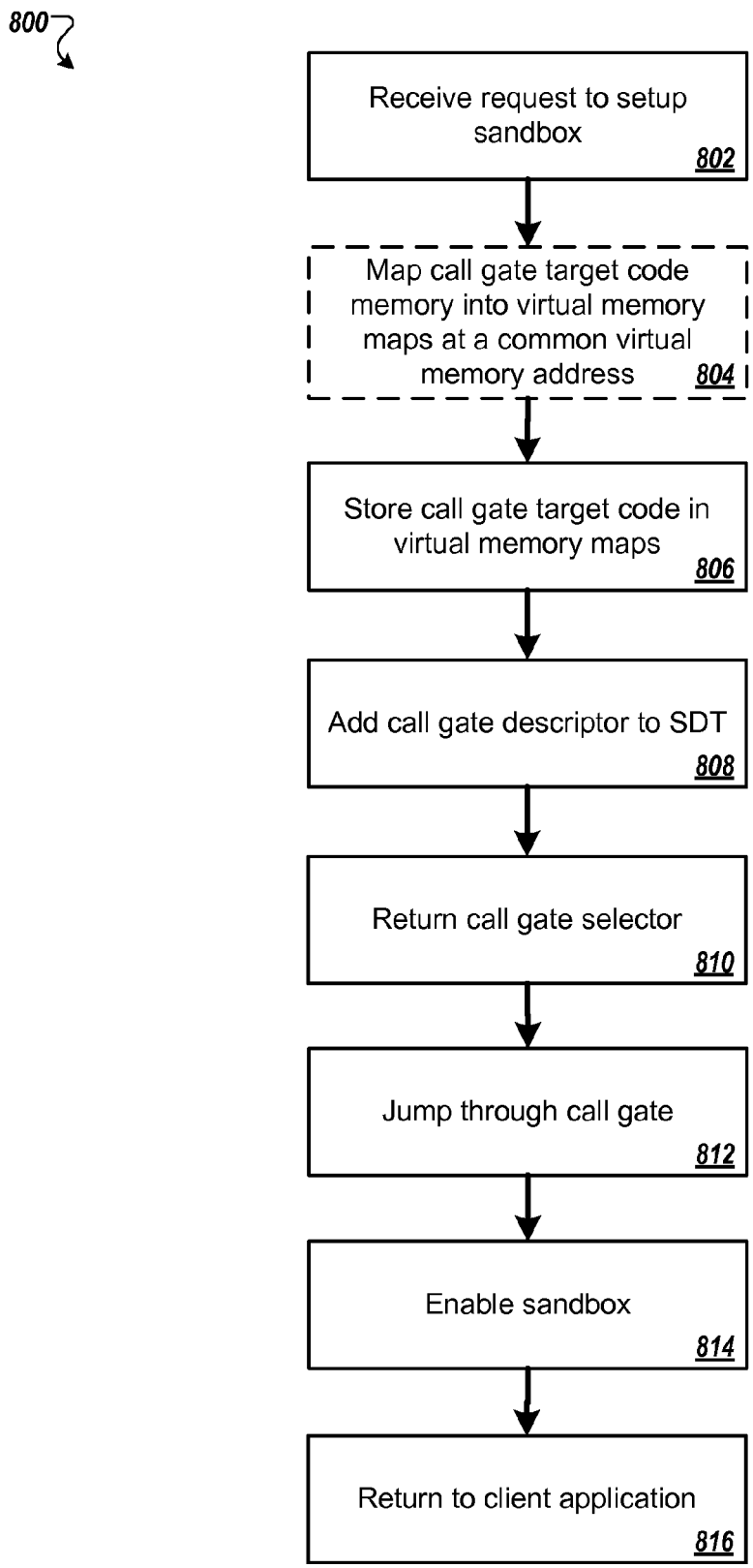
FIG. 8 is a flow chart of an example process for setting up and enabling a sandbox using a call gate.

FIG. 8 is a flow chart of an example process 800 for enabling a sandbox using a call gate. The computing system of FIG. 1 can perform the process 800.

The process 800 starts by receiving a request to setup a sandbox (step 802). For example, referring to FIGS. 3A-B, the client application 306 can generate an instance of a thread (e.g., thread 104) it would like to run in a secure sandbox. The client application 306 can call the API 103 provided by the device driver 102. In some implementations, the sandbox driver 302 maps call gate target code memory into virtual memory maps for the client 306 and the operating system kernel 308 at a common virtual memory address (step 804). For example, the sandbox driver 302 can map memory for use by the client application 306 into a virtual memory map. The sandbox driver 302 can map memory for use by the operating system kernel 308 into a virtual memory map. The virtual memory map of the client application 306 and the virtual memory map of the operating system kernel can use a common virtual address. Call gate target code is stored in the virtual memory maps at the common virtual address (step 806). For example, the call gate target code can be used by the client application 306 to enable and access the secure sandbox without the use of the operating system kernel. A call gate descriptor is added to a SDT 312 (step 808). A call gate selector is returned to the client application (step 810). For example, the device driver API 103 returns the call gate segment selector 208a that references the call gate descriptor 202 in the SDT 200 for the client application 306. The client application 306 stores the call gate segment selector 208a in memory.

In order to enable the secure sandbox, the client application jumps through the call gate (step 812). For example, the client application 306 can make a far call to the call gate 314 using segment selector 208a. The sandbox is enabled (step 814). For example, the call gate 314 can access the device driver 102 included in the sandbox driver 302 to enable the IDT-based sandbox. Once enabled, control is returned to the client application (step 816). For example, the device driver 102 included in the sandbox driver 302 can return control directly to the client application 306.

In some implementations, a device driver can modify an IDTR to point to a custom IDT without restoring the original value of the IDTR when passing control to the kernel. This may be problematic as the operating system may detect the change in the IDTR. This IDTR change may be flagged by the operating system.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, some terms used herein are associated with the x86 family of processor architectures (e.g., IDT, IDTR, page fault interrupt=14h), and some terms are associated with the Windows operating system (e.g., device driver), but in some implementations other operating systems and/or processor architectures can be used. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. Secure sandboxing can be used on a server, desktop system, a mobile computing device or any other system or device that can be connected to a source of untrusted code such as the internet.

What is claimed is:

1. A method performed by a computing system, the method comprising:
   receiving a request from an application to enable a secure sandbox;
   responsive to receiving the request, adding a call gate descriptor for a call gate to a segment descriptor table for the application, the call gate descriptor configured to specify:
      a first privilege level of the application, the first privilege level associated with the call gate; and
      a second privilege level requested by the call gate, the second privilege level being relatively higher than the first privilege level;
   providing a call gate selector for the call gate descriptor to the application in response to the request;
   receiving a far call from the application, the far call having a segment selector that references the call gate descriptor; and
   responsive to receiving the far call:
      transitioning into the second privilege level;
      switching into the call gate target code based on the segment selector;
      enabling selective redirection by at least executing the call gate target code; and
      returning control to the application responsive to the selective redirection being enabled.

2. The method of claim 1, further comprising:
   storing, before adding the call gate descriptor and using one common virtual address, a call gate target code in a virtual memory map of the application and in a virtual memory map of a kernel, the call gate target code configured to provide selective redirection of calls from the application, wherein the call gate descriptor further specifies the common virtual address as a target address for the call gate.

3. The method of claim 1, further comprising:
   executing, by the call gate target code, an interrupt disable instruction when switching into the call gate target code;
   receiving, after the far call from the application and before executing the interrupt disable instruction, an interrupt;
   processing the interrupt;
   restoring, by the call gate target code, a value for a control register, the value indicating a physical address for the virtual memory map of the application;
   modifying, by the call gate target code, one or more entries in a stack;
   enabling the secure sandbox; and
   returning control to the application upon the enabling of the secure sandbox.

4. The method of claim 1, wherein the first privilege level is at ring 3, the second privilege level is at ring 0, and executing the call gate target code enables the secure sandbox.

5. The method of claim 1, wherein the far call further comprises an offset set equal to zero.

6. A computer storage device encoded with a computer program, the program comprising instructions that when executed by data processing apparatus cause the data processing apparatus to perform operations comprising:
   receiving a request from an application to enable a secure sandbox;
   responsive to receiving the request, adding a call gate descriptor for a call gate to a segment descriptor table for the application, the call gate descriptor a first privilege level of the application and a second privilege level requested by the call gate, the first privilege level associated with the call gate, the second privilege level being relatively higher than the first privilege level;
   providing a call gate selector for the call gate descriptor to the application in response to the request;
   receiving a far call from the application, the far call having a segment selector that references the call gate descriptor; and
   in response to the far call:
      transitioning into the second privilege level;
      switching into the call gate target code based on the segment selector;
      executing the call gate target code to enable a selective redirection; and
      returning control to the application upon the enabling of the selective redirection.

7. The computer storage device of claim 6, wherein the operations further comprise:
   storing, before adding the call gate descriptor and using one common virtual address, a call gate target code in a virtual memory map of the application and in a virtual memory map of a kernel, the call gate target code configured to provide selective redirection of calls from the application, wherein the call gate descriptor further specifies the common virtual address as a target address for the call gate.

8. The computer storage device of claim 6, wherein the operations further comprise:
   executing, by the call gate target code, an interrupt disable instruction when switching into the call gate target code;
   receiving, after the far call from the application and before executing the interrupt disable instruction, an interrupt;
   processing the interrupt;
   restoring, by the call gate target code, a value for a control register, the value indicating a physical address for the virtual memory map of the application;
   modifying, by the call gate target code, one or more entries in a stack;
   enabling the secure sandbox; and
   returning control to the application upon the enabling of the secure sandbox.

9. The computer storage device of claim 6, wherein the first privilege level is at ring 3, the second privilege level is at ring 0, and executing the call gate target code enables the secure sandbox.

10. The computer storage device of claim 6, wherein the far call further comprises an offset set equal to zero.

11. A system comprising:
a processor; and
a computer readable storage device coupled to the processor and having stored therein an application, a device driver, and an operating system kernel,
the computer readable storage device further having instructions that, responsive to execution by the processor, cause the processor to:
receive a request from an application to enable a secure sandbox;
responsive to the request being received, add a call gate descriptor for a call gate to a segment descriptor table for the application, the call gate descriptor configured to specify a first privilege level of the application and a second privilege level requested by the call gate, the second privilege level being relatively higher than the first privilege level;
provide a call gate selector for the call gate descriptor to the application in response to the request;
receive a far call from the application, the far call having a segment selector that comprises the call gate descriptor; and
responsive to the far call being received:
transition into the second privilege level;
switch into the call gate target code based on the segment selector;
execute the call gate target code to enable a selective redirection; and
return control to the application upon the enabling of the selective redirection.

12. The system of claim 11, wherein the instructions, responsive to execution, further cause the processor to:
store, prior to the call gate descriptor being added and using one common virtual address, a call gate target code in a virtual memory map of the application and in a virtual memory map of a kernel, the call gate target code configured to provide selective redirection of calls from the application, wherein the call gate descriptor further specifies the common virtual address as a target address for the call gate.

13. The system of claim 11, the computer readable storage device having further stored therein a stack, and wherein the instructions, responsive to execution, further cause the processor to:
execute, by the call gate target code, an interrupt disable instruction when switching into the call gate target code;
receive, after the far call from the application and before executing the interrupt disable instruction, an interrupt;
process the interrupt;
restore, by the call gate target code, a value for a control register, the value indicating a physical address for the virtual memory map of the application;
modify, by the call gate target code, one or more entries in the stack;
enable a secure sandbox; and
return control to the application upon the enabling of the secure sandbox.

14. The system of claim 11, wherein the first privilege level is at ring 3, the second privilege level is at ring 0, and executing the call gate target code enables a secure sandbox.

15. The system of claim 11, wherein the far call further comprises an offset set equal to zero.

16. The system of claim 11, wherein the secure sandbox is configured to prevent execution of a thread from transferring control directly to the operating system kernel.

17. The system of claim 11, wherein the device driver is configured to:
access a permissions table to identify one or more interrupt values or one or more system call values associated with a trapped call; and
determine that the trapped call with an associated interrupt value or system call value that is not included in the permissions table comprises a call that is to be executed within the secure sandbox.

18. The system of claim 11, wherein the instructions, responsive to execution by the processor, further cause the processor to enable the sandbox thread without using the operating system kernel.

19. The system of claim 11, wherein the instructions, responsive to execution by the processor, further cause the processor to:
access a permissions table to identify one or more interrupt values or one or more system call values associated with a trapped call;
determine that the trapped call comprises an interrupt that is flagged for execution outside of the secure sandbox based on an associated interrupt value that is included in the permissions table.

20. The system of claim 18, wherein the instructions, responsive to execution by the processor, further cause the processor to:
identify and trap a new call;
access a permissions table to identify one or more interrupt values or one or more system call values associated with the trapped call;
determine that the trapped call comprises an interrupt instruction or an operating system instruction that mandates shutdown of the secure sandbox; and
call the operating system kernel to terminate the secure sandbox.

* * * * *